United States Patent
Thompson

(10) Patent No.: US 10,311,358 B2
(45) Date of Patent: Jun. 4, 2019

(54) SYSTEMS AND METHODS FOR MULTI-OBJECTIVE EVOLUTIONARY ALGORITHMS WITH CATEGORY DISCOVERY

(71) Applicant: THE AEROSPACE CORPORATION, El Segundo, CA (US)

(72) Inventor: Timothy Guy Thompson, Purcellville, VA (US)

(73) Assignee: The Aerospace Corporation, El Segundo, CA (US)

( * ) Notice: Subject to any disclaimer, the term of this patent is extended or adjusted under 35 U.S.C. 154(b) by 905 days.

(21) Appl. No.: 14/796,299

(22) Filed: Jul. 10, 2015

(65) Prior Publication Data
US 2017/0011292 A1    Jan. 12, 2017

(51) Int. Cl.
G06F 15/18    (2006.01)
G06N 3/12    (2006.01)

(52) U.S. Cl.
CPC .................................. *G06N 3/126* (2013.01)

(58) Field of Classification Search
CPC .......... G06F 17/11; G06F 17/19; G06F 17/24; G06F 3/126
USPC .............................................. 706/12, 15, 45
See application file for complete search history.

(56) References Cited

U.S. PATENT DOCUMENTS

| | | |
|---|---|---|
| 5,319,781 A | 6/1994 | Syswerda |
| 5,568,500 A | 10/1996 | Furuya et al. |
| 6,532,076 B1 | 3/2003 | Sidorowich |
| 6,662,167 B1 | 12/2003 | Xiao |
| 6,941,287 B1 * | 9/2005 | Vaidyanathan ...... G06K 9/6229 706/12 |
| 7,835,929 B2 | 11/2010 | Bennett |
| 7,996,344 B1 | 8/2011 | Goel |
| 8,069,127 B2 | 11/2011 | Taylor et al. |
| 8,255,344 B2 | 8/2012 | Ferringer et al. |
| 8,255,345 B2 | 8/2012 | Ferringer et al. |
| 8,285,653 B2 | 10/2012 | Ferringer et al. |
| 8,433,662 B2 | 4/2013 | Ferringer et al. |
| 8,494,988 B2 | 7/2013 | Ferringer et al. |
| 8,498,952 B2 | 7/2013 | Ferringer et al. |
| 8,504,496 B2 | 8/2013 | Ferringer et al. |

(Continued)

FOREIGN PATENT DOCUMENTS

WO    WO2010132804 A1    11/2010

OTHER PUBLICATIONS

Office Action for U.S. Appl. No. 14/963,870, dated Oct. 3, 2018, Thompson et al, "Systems and Methods for Multi-Objective Evolutionary Algorithms with Soft Constraints", 28 pages.

(Continued)

*Primary Examiner* — David R Vincent
(74) *Attorney, Agent, or Firm* — Ritwik Chatterjee; Lee & Hayes PC

(57) ABSTRACT

Systems and methods are provided to engage in multi-tiered optimization where there may be a first multi-objective optimization and a second constraint optimization. The multi-objective optimization may be used to drive to one or more goals of the optimization problem. The constraint optimization or minimization may be used to drive towards a reduced and/or no constraint situation where the solution to the overall problem is feasible or near-feasible.

20 Claims, 10 Drawing Sheets

(56) References Cited

U.S. PATENT DOCUMENTS

| | | | |
|---|---|---|---|
| 8,560,472 | B2 | 10/2013 | Ferringer et al. |
| 8,862,627 | B2 | 10/2014 | Ferringer et al. |
| 9,189,733 | B2 | 11/2015 | Thompson et al. |
| 9,321,544 | B2 | 4/2016 | Thompson et al. |
| 2002/0013776 | A1 | 1/2002 | Kishi |
| 2005/0187846 | A1 | 8/2005 | Subbu et al. |
| 2007/0005522 | A1 | 1/2007 | Wren |
| 2008/0010044 | A1 | 1/2008 | Ruetsch |
| 2008/0094250 | A1 | 4/2008 | Myr |
| 2008/0215512 | A1* | 9/2008 | Narzisi ............... G06N 3/126 706/13 |
| 2008/0234944 | A1 | 9/2008 | Schaffer et al. |
| 2008/0241839 | A1 | 10/2008 | Potkin et al. |
| 2009/0313191 | A1* | 12/2009 | Yao .................. G06F 17/5045 706/13 |
| 2010/0046806 | A1 | 2/2010 | Baughman et al. |
| 2010/0292929 | A1 | 11/2010 | Ferringer et al. |
| 2010/0293120 | A1 | 11/2010 | Ferringer et al. |
| 2010/0293122 | A1 | 11/2010 | Ferringer et al. |
| 2010/0293313 | A1 | 11/2010 | Ferringer et al. |
| 2011/0078100 | A1 | 3/2011 | Goel |
| 2012/0029965 | A1 | 2/2012 | Steffen et al. |
| 2012/0063590 | A1* | 3/2012 | Dortschy ............... H04B 3/32 379/406.01 |
| 2012/0084314 | A1 | 4/2012 | Ferringer et al. |
| 2013/0024395 | A1 | 1/2013 | Clark et al. |
| 2013/0054045 | A1* | 2/2013 | Ramezani .......... B60L 11/1844 700/297 |
| 2013/0132042 | A1 | 5/2013 | Chan |
| 2014/0278695 | A1 | 9/2014 | Smith et al. |
| 2015/0161629 | A1* | 6/2015 | Verma ............... G06Q 30/0202 705/7.31 |
| 2017/0068890 | A1 | 3/2017 | Thompson |
| 2017/0169353 | A1 | 6/2017 | Thompson et al. |
| 2017/0293839 | A1 | 10/2017 | Thompson et al. |
| 2017/0364812 | A1 | 12/2017 | Thompson et al. |
| 2018/0082198 | A1 | 3/2018 | Thompson et al. |
| 2018/0082209 | A1 | 3/2018 | Thompson |

OTHER PUBLICATIONS

Office Action for U.S. Appl. No. 15/094,521, dated Nov. 29, 2018, Thompson et al, "Systems and Methods for Multi-Objective Heuristics with Conditional Genes", 26 pages.

Abraham, Andrew, "Particle Swarm Optimization of Low-Thrust, Geocentric-to-Halo-Orbit Transfers," May 2014, Thesis and Dissertation, Lehigh University, 202 pages.

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Mech. Engrg. 186 (2000) pp. 221-238; Elsevier Science S.A.

Chuang, et al.; "An Extensible Genetic Algorithm Framework for Problem Solving in a Common Environment"; 2000; IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006; Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer, Matthew P. "General Framework for the Reconfiguration of Satellite Constellations." 2009, Dissertation, The Pennsylvania State University, Available at <http://etda.libraries. psu.edu/lheses/approved/WorldWideIndex/ETD-3537/index.html>, 40 pages.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi- objective Optimization (VIDEO)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kollat et al., "The Value of Online Adaptive Search: A Performance Comparison of NSGAII, epsilon-NSGAII and epsilonMOEA." Springer-Verlag Berlin Heidelberg 2005. 386-398.

Laumanns et al.; "Combining Convergence and Diversity in Evolutionary Multi-Objective Optimization"; 2002; Massachusetts Institiute of Technology; Evolutionary Computation 10(3); pp. 1-21.

Lorenz, Edward, "Predictability: A Problem Partly Solved," 1996, In Proc. Seminar on Predictability, vol. 1, No. 1, 18 pages.

Mackey et al, "Oscillation and Chaos in Physiological Control Systems," Jul. 15, 2977, Science. 197(4300): 287-289.

Muhlenbein et al.; "Evolution in time and space—the parallel genetic algorithm."; 1991; Morgan Kaufmann; pp. 1-22.

Office Action for U.S. Appl. No. 13/837,782, dated Jan. 15, 2015, Smith et al., "Systems and Methods for Prioritizing Funding of Projects", 21 pages.

Office Action for U.S. Appl. No. 13/837,782, dated Oct. 20, 2016, Smith et al., "Systems and Methods for Prioritizing Funding of Projects", 16 pages.

Office Action for U.S. Appl. No. 13/837,782, dated Mar. 30, 2017, Smith et al., "Systems and Methods for Prioritizing Funding of Projects", 20 pages.

Office Action for U.S. Appl. No. 13/837,782, dated Apr. 7, 2016, Smith et al., "Systems and Methods for Prioritizing Funding of Projects", 14 pages.

Office action for U.S. Appl. No. 14/847,424, dated Jun. 28, 2018, Thompson, "Systems and Methods for Multi-Objective Optimizations with Live Updates", 24 pages.

(56) References Cited

OTHER PUBLICATIONS

Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.

Srinivas et al., "Multiobjective Optimization Using Nondominated Sorting in Genetic Algorithms," 1994. Evolutionary Computation, 2(3): 221-248.

Stodgell et al., "Satellite Rendezvous Tours Using Multiobjective Evolutionary Optimization."Astrodynamics 2007: Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.

Subbu, et. al., "Management of Complex Dynamic Systems based on Model-Predictive Mutli-objective Optimization", IEEE International Conference on Computational Intelligence for Measurement Systems and Applications, Jul. 2006, pages.

Tan et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.

Tang, Yong, "Advancing Hydrologic Model Evaluation and Identification Using Multiobjective Calibration Sensitivity Analysis and Parallel Computation." ProQuest Information and Learning Company. 2007, 48 pages.

Tang et al., "Parallelization Strategies for Rapid and Robust Evolutionary Multiobjective Optimization in Water Resources Applications." Advances in Water Resources. 2006, 1-39.

Van Veldhuizen et al., "Considerations in Engineering Parallel Multiobjective Evolutionary Algorithms." IEEE Transactions on Evolutionary Computation. vol. 7, No. 2, Apr. 2003. 144-173.

Van Veldhuizen et al., "(Final Draft) TR-98-03 Multiobjective Evolutionary Algorithm Research: A History and Analysis" Oct. 14, 1998; pp. 1-30.

Ventura et al.; "JCLEC: a Java framework for evolutionary computation"; 2007; Springer-Verlag; pp. 381-392.

Zimmer et al., "Utilizing Evolutionary Algorithms for Problems with Vast Infeasible Regions and Expensive Function Evaluations." The Aerospace Corporation. Jun. 27, 2008, 12 pages.

* cited by examiner

SYSTEMS AND METHODS FOR MULTI-OBJECTIVE EVOLUTIONARY ALGORITHMS WITH CATEGORY DISCOVERY

FIELD OF THE DISCLOSURE

Aspects of the disclosure are related generally to multi-objective evolutionary algorithms, and more particularly to systems and methods for category discovery.

BACKGROUND OF THE DISCLOSURE

Large-scale value-based non-linear models often require large numbers of decision variables and constraints (e.g., over a million). Multi-objective Evolutionary Algorithms (MOEA) may fail when they have such a large number of decision variables and constraints. Often times in these MOEA, the computational bandwidth needed to search a relatively large decision variable space and to evaluate whether a potential solution violates a constraint may be relatively high, where the cause of the constraint may be too complex to facilitate driving to feasibility. In some cases, determining whether potential solutions violate constraints may require similar or even more computational bandwidth than evaluations of potential solutions on the basis of one or more objectives.

BRIEF DESCRIPTION OF THE DRAWINGS

Reference will now be made to the accompanying drawings, which are not necessarily drawn to scale, and wherein.

DETAILED DESCRIPTION

Figure 1:
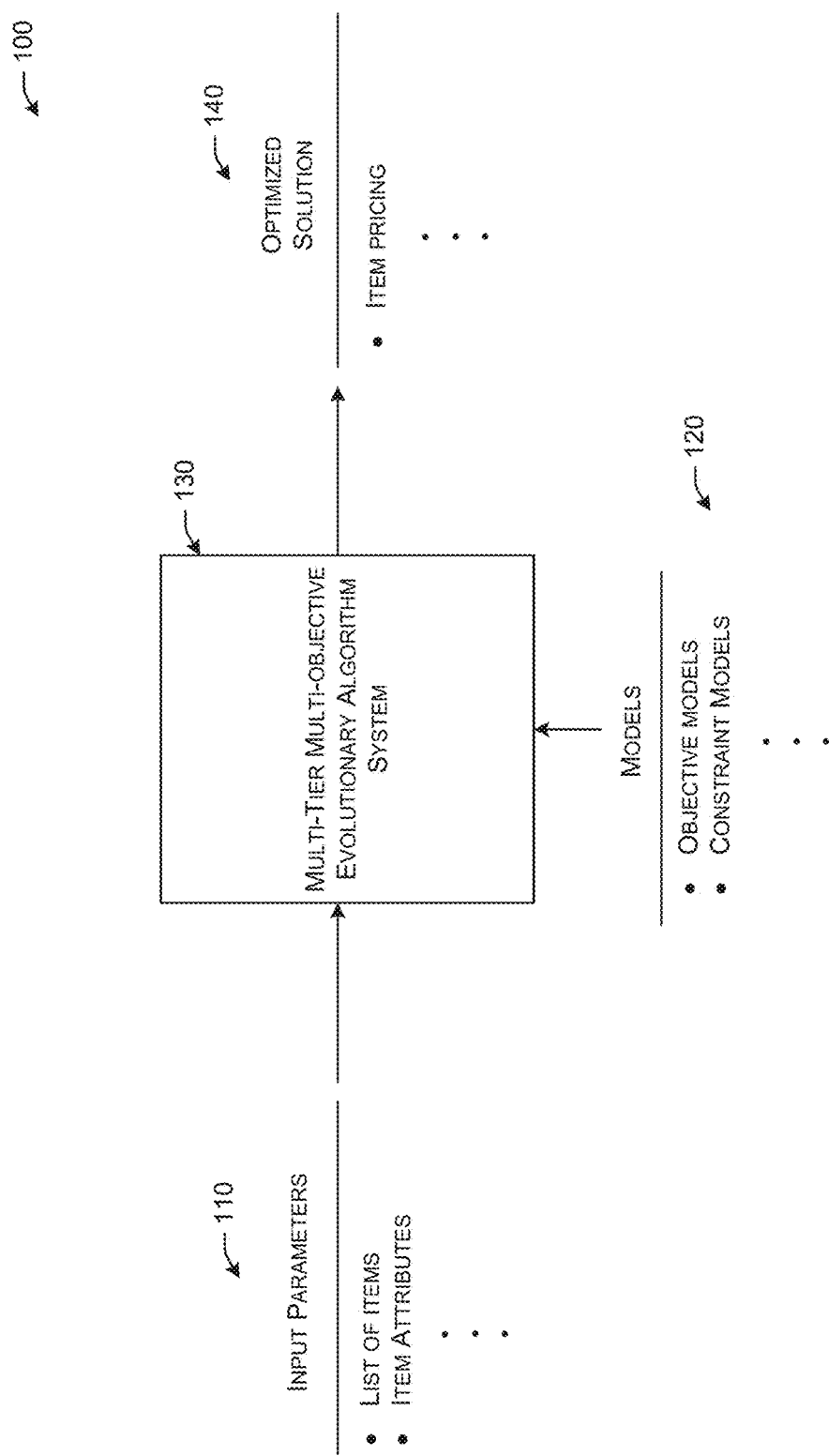
FIG. 1 is a schematic diagram that illustrates an example environment with input parameters and optimized solutions based on one or more objective models and/or constraint models of a multi-tier multi-objective evolutionary algorithm (MOEA) system 130, in accordance with embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include a multi-tiered optimization, such as a two-tier optimization, using multi-objective evolutionary algorithms (MOEAs). Evolutionary algorithms have been described in a variety of other publications including commonly owned U.S. patent application Ser. No. 12/550,858, filed on May 12, 2010 and titled "Systems and Methods for Generating Feasible Solutions form Two Parents for an Evolutionary Process", the contents of which, in its entirety, is incorporated herein by reference.

In example embodiments, in one or more tiers of the optimization, candidate solutions may be optimized according to constraints. In other words, in these one or more optimization tiers, solutions may be driven to feasibility (e.g., feasible solutions or less constrained solutions may be discovered). In other of the one or more optimization tiers, solutions may be optimized according to one or more objectives. In example embodiments, feasible and/or near-feasible solutions from the feasibility optimization processes may be provided to the objective optimization processes for evaluation, non-domination ranking, and generation of further candidate solutions for evaluation (e.g., constraint evaluation, objective evaluation, or both).

Example embodiments introduce a novel mechanism for scalable re-formulation of an optimization problem, particularly a multi-constraint optimization problem, into a category discovery optimization with negotiation based driving which allocates items into categories with constraint minimization, where: 1) items are the model's decision variables but may not be declared as genes; 2) categories, buckets holding the items, that are discovered and optimized; and 3) negotiation based driving is a mechanism to allocate items into categories while driving to feasibility (no constraint violations).

In a secondary optimization process the items may be assigned to categories with a minimization of constraint violations. In accordance with the disclosure, a scalable optimization technique to discover these categories along with assignments of the items to the categories may be performed. A MOEA mechanism is defined where the decision variables are a variable number of categories, each with attributes (e.g. price of items in a pricing problem). In the secondary optimization process, which may include negotiation based driving for constraint minimization, items may be allocated into the categories. The items are gathered from the buckets and become the decision variables presented to an objective model (the function evaluation) which computes the value metrics to be optimized. The items may be the decision variables but they may not be genes, thereby allowing for scalability to millions of decision variables. The items may have attributes, some of which are set by an infeasibility checking model, such as potential and item constraint violations (item-CV). For example in a ticket pricing example, the potential may be defined as the likelihood a particular type of ticket will be sold (e.g., based on historical and live data).

In example embodiments, given a chromosome containing the categories along with its attributes, prior to evaluation according to the objective model(s), a secondary optimization may be initiated to assign the items into the categories. This may be the negotiation based driving, as performed by a secondary MOEA optimization process. This secondary MOEA process may be performed in the constraint space to drive to feasibility, or at least reduced infeasibility. In some example embodiments, the negotiation based driving may be visualized as a stock market trading, where the items in the categories (e.g., buckets) are analogous to stocks, the buckets have 'fund managers' who assess the value and decide which items to trade, with the goal of increasing an overall value of a bucket and reducing constraint violations. The items inherited from the parent chromosomes may have a potential assigned to them by the objective model, which is historical and live information, measuring a potential for the item to realize the value (i.e., for the ticket to be purchased). The negotiation phase may be trading of items, and the driving phase may be the constraint driving to feasibility mechanism. Because this is a secondary optimization, in example embodiments, a well-defined termination criterion may be known to stop the trading and then a selection may be made from the non-dominated archive containing the bucket assignments.

In example embodiments, a child population of a primary optimization (e.g., multi-objective optimization) where each child undergoes negotiation based driving and constraint minimization may be provided to the secondary optimization (e.g., constraint optimization/minimization). In these embodiments, the selected parent chromosomes may be transferred to a slave core for processing efficiency, a population of children may be produced and the items from the parent's buckets may be blended into each produced child chromosome. Given the same item but found in potentially different buckets, MOEA operations similar to those used on genes may be applied to the items to determine the bucket assignment. With this method a child population may be generated from the same parents but each with different item assignments, while retaining MOEA building blocks. The child chromosomes are passed to the constraint assessment model to: 1) set overall constraint violations; and 2) to provide potential value for each item as required by the negotiation based driving; and 3) to set individual item constraint violations. Note that each item is associated with a list of which buckets it has had item level constraint violations. A secondary optimization may be performed in the constraint space to drive the children to feasibility. This feasibility driving is done during the negotiated trades when: 1) items in a bucket with an item constraint violation set are traded; and 2) the item's list of item level constraint violation are referenced when selecting a bucket to be traded into. This feasibility driving, in example embodiments, may allow for scaling to relatively large numbers of constraints. When the constraint driving termination criteria occurs, a child chromosome is selected from the non-dominated set and may be sent back to the primary optimization model for evaluation.

In these example embodiments, the optimization process may be performed by heuristic mechanisms that emulate biological processes (e.g., cross-over, mutation, etc.) on populations that may be optimized for feasibility or constraint minimization or elimination of constraints of the potential solutions being evaluated based on performance metrics determined using objective models. The process of generating or selecting potential solution that are feasible or at least minimally constrained may be performed by heuristic mechanisms that involve an iterative allocation and constraint evaluation of potential solutions to the multi-objective problem. This algorithm may be performed by a secondary optimization engine or constraint optimization engine. This constraint optimization engine may accept parent solution(s) from a primary optimization or objective optimization engine and find new potential solutions that may provide for a reduced or eliminated set of constraints. In this way the objective optimization engine may pass solutions to the constraint optimization engine and vice-versa, until a stopping criteria is achieved to generate an optimized or near optimized solution to the multi-objective problem.

The constraint optimization engine, therefore, may take a variety of items and allocate those items to various categories or bins. After an allocation is made, one or more constraint models may be applied (e.g., linear constraint equation(s), non-linear constraint definition(s), etc.) may be applied to identify if there are any constraint violations. If there are constraint violations, then a mechanism of trading items between buckets may be engaged to drive to a unconstrained, or at least a less constrained, potential solution. As a result, a solution with relatively reduced or fully eliminated constraint violations may be generated and that solution may be passed back to the objective optimization engine for evaluation based on the set of objective models (e.g., linear objective equation(s), non-linear objective definition(s), etc.).

It will be appreciated that the multi-objective problem may be any suitable multi-objective problem. In example embodiments, the methods and systems, as described herein, may be suited for solving pricing optimization problems. In other example embodiments, the methods and systems, as described herein, may be suited for scheduling problems. In other example embodiments, the methods and systems, as described herein, may be suited for multi-parameter optimization. Indeed, in other example embodiments, the optimization problem to which the methods and systems described herein may be applied may be a combination of various elements, such as pricing, timing, or any other suitable parameter input.

In one non-limiting example, the systems and methods, as described herein, may be applied to optimizing the pricing of various hotel rooms that may be available to a hotel or chain of hotels. The pricing may be optimized within the constraints of offering the hotel rooms for rental. In this example, each of the various types of rooms (queen bed/facing the beach, two double beds/facing the pool, etc.) may be represented as individual items. The items may be allocated to various categories representing price. Each category (e.g., price bin) may have none, one, or multiple items (e.g., room types) allocated thereto. Once a particular allocation is made, a number of constraint models may be invoked to identify if there are constraint violations associated with the allocation provided. In this example, the constraint models may be models that estimate the occupancy of a room type at various prices of that room type. For example, a constraint model may estimate that an available inventory of a particular room type may by 60% occupied at a particular price point. Therefore, if that room type item is allocated the category representing that price point, then the constraint model applied to that particular item may return an estimated 60% occupancy figure. In the evaluation of constraints, there may further be threshold levels that define the constraint and the acceptable range of any variety of constraint metrics. Continuing with this example, the constraint may include that the occupancy estimate of each of the types of rooms must be between 80% and 100% (e.g., the occupancy estimate, based on the constraint model(s), must not be above 100% or less than 80%). If this constraint is violated, then a trading procedure may be performed to reallocate items (e.g., hotel room types) to categories (e.g., price buckets) to reduce or eliminate any constraint violations (e.g., drive to an unconstraint potential solution).

Once an unconstrained potential solution is generated at the constraint optimization engine, the solution may be provided to the objective optimization engine for the purpose of proving a solution that is optimized (e.g., pareto-optimized) for one or more objectives. Continuing with the non-limiting example above, an objective of the hotel room occupancy optimization problem may be to maximize revenue. Another objective may be to maximize profit and/or reduce the possibility of customer dissatisfaction. Indeed, the objectives may include any suitable objective. The objective optimization engine may generate one or more potential solutions (e.g., solutions that advance the pareto-front in the context of the multiple objectives) that may again be provided to the constraint optimization engine for the purpose of constraint optimization. In this way, potential solutions may be passed back and forth between the objective optimization engine and the constraint optimization engine to optimize potential solutions both from a constraint standpoint and an objective standpoint.

It will be appreciated that the systems and methods, as described herein, may be configured, in example embodiments, for any variety of suitable optimization problems, including any variety of resource allocation and pricing optimization problem. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In example embodiments, the systems and methods, as described herein, may be particularly suited for solving relatively highly-constrained multi-objective pricing optimization problems.

It will further be appreciated that the systems and methods, as described herein, may be configured, in example embodiments, any variety of parameter optimization problem. For example, a variety of factory-based manufacturing parameters of various manufacturing equipment may be optimized for any variety of objectives, such as manufacturing yield and/or manufacturing throughput, etc. In example embodiments, the systems and methods, as described herein, may be particularly suited for solving relatively highly-constrained multi-objective manufacturing optimization problems.

It will still further be appreciated that the systems and methods, as described herein, may be configured, in example embodiments, to ascertaining trade-offs in the factor input space of various production and/or services. For example, a consulting firm may apply the methods and systems described herein to identify if the types and volumes of consultancy services that may be offered to optimize the level of risk versus profit that may be assumed by the firm. In another example, a company may use the methods and systems, as described herein, to determine how many and of what training and experience of employees it should hire to meet one or more of its objectives.

FIG. 1 is a schematic diagram that illustrates example environment 100 with input parameters 110 and optimized solutions 140 based on one or more objective models and/or constraint models 120 of a multi-tier multi-objective evolutionary algorithm (MOEA) system 130, in accordance with embodiments of the disclosure. While a particular configuration of the multi-tier MOEA system 130 is depicted herein, it will be appreciated that the configuration may vary depending on particular application of the multi-objective MOEA system 130, according to various embodiments of the disclosure. Indeed, there may be any variety of input parameters 110, models 120, system 130, and/or optimized solutions 140.

The input parameters 110 may be any suitable set of parameters, including, in example embodiments, a listing of items and one or more attributes of items. Items, according to example embodiments, may include a grouping of elements that may be allocated collectively to a particular category or bin. For example, in the context of pricing hotel rooms, as discussed above, items may represent different types of hotel rooms that may be offered for rental. The categories, in this example embodiment, may include various price points at which the different groups of hotel rooms may be priced. The item attributes may include any variety of descriptors and/or parameters associated with a corresponding item. These descriptors may be any variety of naming of the item or any type of parameters that may indicate any quality or naming of the items. For example, in reference to the previous example of the hotel rooms, the attributes may include descriptors of a particular item (e.g., type of hotel room). Such descriptors may include, for example, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular item among more than one (e.g., many) items.

The models 120 may include objective model(s) that may be used by the multi-objective optimization engine and constraint models that may be used by the constraint optimization models. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like. The constraint models may provide value(s) for any variety of constraints that may be navigated in the constraint optimization mechanism. For example, with pricing optimization problems, the objective model(s) may be used to evaluate the total number of sales of a particular item at a particular price point (e.g., bucket allocation).

As shown, the result of optimization based on the input parameters 110 and by using the models 120, outputs 140 may be generated by the multi-tiered optimization system 130. The outputs may be one or more variables that are optimized in accordance with the models 120 by the multi-tiered optimization system 130. For example, in a pricing optimization problem, the outputs may be an indication of a price or range of prices of various products (e.g., hotel rooms, airline flights, insurance products, investment products, types of mobile electronic devices, etc.) that do not violate any constraints, or at least minimizes constraint violations, while providing an optimized solution on the basis of the one or more objective functions.

As a non-limiting example, the results or output of a pricing optimization problem applied to hotel rooms may result in a king bed/beach facing room priced at $299 per night, a twin bed/beach facing room at $249 per night, a king bed/courtyard facing room at $199 per night, and a twin bed/garden facing room at $179 per night. This is by way of example only and it will be appreciated that, in example embodiments, there may be more than four items to be priced. For example, a world-wide hotel chain may wish to price its rental rooms across all of its worldwide properties. In such an example, constraints may arise from the hotel chain, at least in the short run, having a fixed number of hotel rooms. As another example, an airline may wish to price all flights that it has on its network (e.g., 2000 daily sorties), including multi-leg flights. In such an example, constraints may arise from the airline, at least in the short run, having a fixed number of available seats for each seating class between any two cities. As yet another example, a consumer electronics company may wish to price its entire range of notebook computers, table computers, and smartphones with various trims and options. In such an example, constraints may arise from the consumer electronics company, at least in the short run, having a fixed manufacturing capacity across its line of products in shared manufacturing assets (e.g., factories).

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the multi-tiered optimization system 130, a non-domination test may be performed to identify solutions that may be used for generation of subsequent populations of solutions (e.g., child populations generated by crossover, selection, and/or mutation). In some example embodiments, non-dominated solutions, or otherwise solutions that are better than any previous solution with regards to at least one objective and no worse with regards to all objectives, may be propagated for child solutions.

Figure 2:
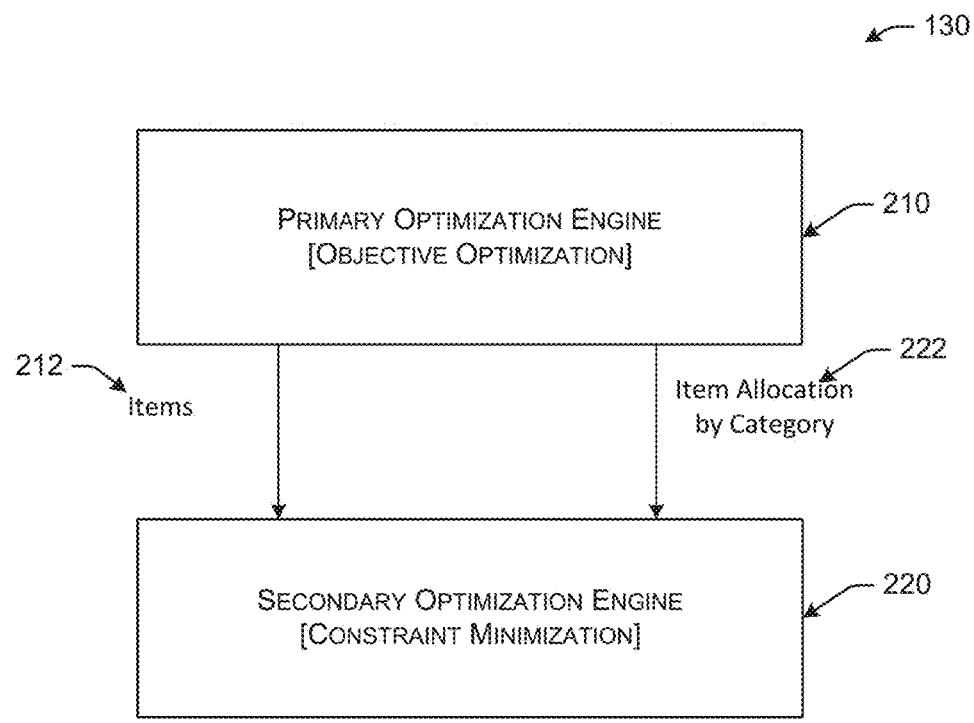
FIG. 2 is a block diagram that illustrates an example multi-tiered optimization system with a primary optimization engine and a secondary optimization engine, in accordance with embodiments of the disclosure.

FIG. 2 is a block diagram that illustrates an example multi-tiered optimization system 130 with a primary optimization engine 210 and a secondary optimization engine 220, in accordance with embodiments of the disclosure. Potential solutions to a multi-objective problem may be passed back and forth between the primary or objective optimization engine 210 and the secondary or constraint minimization engine 220. In so doing, potential solutions may be evaluated and refined, both from an objective optimization standpoint and from a constraint minimization standpoint. In some example embodiments, the objective optimization engine 210 of the multi-tiered optimization system 130.

In example embodiments, the objective optimization engine 210 may pass to the constraint minimization engine 220 one or more items that are to be allocated to categories for the purpose of optimization. In these embodiments, the items may already be passed to the constraint minimization engine 220 as allocated to respective categories. This allocation may represent, from the objective optimization engine 210 perspective, the most optimal, or a relatively highly optimal solution thus far in the optimization process. However, the objective optimization engine 210 may not know if the solution being passed to the constraint minimization engine 220 is within the constraints laid out for the optimization.

The constraint minimization engine may accept the items 212 as allocated as a solution. This solution may represent a solution that is nearly the best solution determined by the objective optimization engine 210 at the point in time that the items 212 are passed to the constraint minimization engine 220. At this point the constraint minimization engine may test the constraints associated with the items 212. If there is a constraint violation at this point, then the constraint minimization engine 220 may perform the task of reducing and/or eliminating constraints associated with the current item allocations. In other words, when an item level constraint violation is detected by applying one or more constraint models 120, the constraint minimization engine 220 may perform various trades (e.g., move constraint violation items from one category to another). Upon generating a new item allocation 222, the constraint minimization engine 220 may transmit the new item allocation 222 to the objective optimization engine 210. The new item allocation by category 222 may be such that none of the items have any item level constraint violations when passed back to the objective optimization engine 210.

Figure 3:
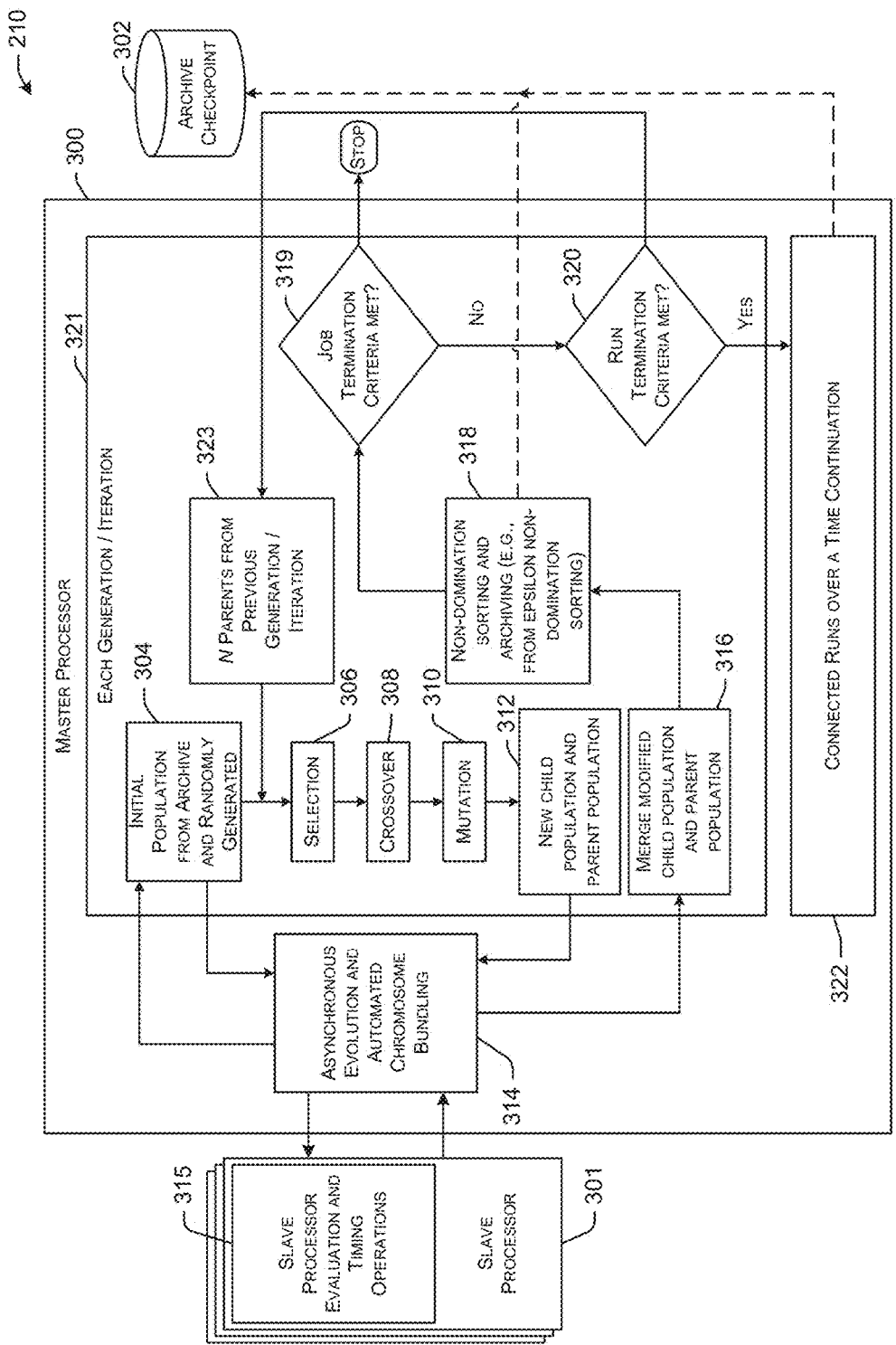
FIG. 3 is a block diagram that illustrates an example objective optimization engine of the example multi-tiered optimization system of FIG. 2, in accordance with embodiments of the disclosure.

FIG. 3 is a block diagram that illustrates an example objective optimization engine 210 of the example multi-tiered optimization system 130 of FIG. 2, in accordance with embodiments of the disclosure. In some example embodiments, the multi-tiered optimization system 130, and particularly the objective optimization engine 210 may be an evolutionary algorithm system, such as those described in at least U.S. Pat. Nos. 8,255,344 and 8,285,653, both of which are incorporated herein, in their entirety by reference.

The evolutionary algorithm system may employ techniques of biologic natural selection to efficiently search a multi-objective optimization space that may not be amenable to search by analytic, iterative, or other methods. In example embodiments, the search variables, such as the prices of various items in a pricing problem, may be organized as a data structure that resembles genes in a chromosome. In example embodiments, the decision variables of the optimization problem (e.g., pricing problem) may be organized as an allocation of items to various categories. In other words, the solution may be represented as a data structure having the various items with their respective corresponding category allocation. In some example embodiments, the solutions may be organized as chromosomes with genes (e.g., individual decision variables) at the objective optimization engine 210 and as an allocation of items to categories at the constraint minimization engine 220.

Upon organizing the search variables, the evolutionary algorithm may proceed to generate child chromosomes, from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., prices of items) from any given generation, based at least in part on the corresponding respective performance on the multiple objectives that are being used to evaluate the optimization problem (e.g., pricing optimization). The evolutionary algorithm system 130, may further be configured to select those chromosomes (e.g., solutions) that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes selecting a relatively optimized solution set (i.e. optimized launch parameters) in accordance with the identified objectives of the optimization. When new child solutions are generated using the biological-styled processes described above, a check for feasibility may be performed. If a potential solution is not feasible, then a drive to feasibility may be performed, such as by the constraint minimization engine 220 on the solutions generated by the objective optimization engine 210.

It can be seen that the mechanisms used by the evolutionary algorithm (e.g., genetic operators, selection, crossover, mutation, etc.), particularly in the form of an evolutionary algorithm system 130, are not mechanisms that are limited to arrive at a convergence in an iterative fashion. Indeed, the mechanism is one that employs intelligent "hopping around" and evaluating according to optimization objectives, rather than just a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the e evolutionary algorithm system 130, as described herein. Although the multi-tiered optimization system 130 is discussed herein in the context of an evolutionary algorithm system, it will be appreciated that the multi-tiered optimization system 130 may be any suitable system for implementing a heuristic optimization, such as, but not limited to Monte Carlo methods, extremal optimization (EO) methods, etc.

In this example embodiment, the multi-tiered optimization system 130, as well as the objective optimization engine 210 and/or the constraint optimization engine 220 may be implemented as an example parallel processing system that executes an evolutionary algorithm, according to an example embodiment of the disclosure. As shown in FIG. 3, a first portion of the evolutionary algorithm may be performed by a master processor 300 while a second portion of the evolutionary algorithm may be performed by one or more slave processors 301, as discussed herein. In some example embodiments, the constraint optimization engine 220 may be implemented on the slave processor(s) 301, while the objective optimization engine may be implemented on the master processor 300.

In an example embodiment of the disclosure, an executed job of the evolutionary algorithm may comprise a plurality of connected runs 322 that occur in a sequence to form a time continuation. Each run 322 may comprise one or more evolutionary operations performed during one or more generations/iterations 321. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 304, the master processor 300 may receive or obtain an initial population of parent chromosome data structure (e.g., an initial set of prices that may be allocated to one or more hotel room types (items)). In other words, the initial population may represent a starting point, such as a best guess or a set of parameters that may represent the current implementation prior to the benefits of the optimization(s), as described herein. In an example embodiment of the disclosure, each parent chromosome data structure (e.g., prices for items in a pricing problem) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 304, the initial population of parent chromosome data structures may be obtained by one or more sources. In an example embodiment of the disclosure, the initial population of parent chromosome data structures may be obtained from a combination of the archive checkpoint 302 and random generation of new chromosome data structures. The archive checkpoint 302 may include a known solution, such as an experiential solution. As a non-limiting example, 25% of the initial population of parent chromosome data structures may be obtained from the archive checkpoint 302 while 75% of the initial population may be randomly generated. The chromosomes obtained from the archive checkpoint 302 may have previously been evaluated in accordance with the objective functions. On the other hand, the randomly generated chromosomes may not have been evaluated in accordance with the objective functions, and thus, they may be delivered to block 314, which allocates the chromosomes to the slave processors 301 for objective function evaluation by block 315. In certain embodiments, the initial population of parent chromosomes may include one or more known solutions, or a baseline solution, provided to the heuristic optimizer system in the form of an evolutionary algorithm system.

The archive checkpoint 302 may include an elite set of chromosome data structures (i.e., elite solutions of launch parameter sets of the satellite constellation under design) obtained from one or more prior generations/iterations 321, according to an example embodiment of the disclosure. Initially, the archive checkpoint 302, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 302 may take the form of a data file or database stored in a computer memory, computer disk, network storage, or other non-volatile memory. In accordance with embodiments of the disclosure, the archive checkpoint 302 may contain one or more elite set of chromosomes, such as known solutions.

Archived chromosome data structures that were previously evaluated in a prior generation/iteration 321 may be associated with a plurality of objective function values corresponding to a respective plurality of objective functions. Each objective function may be associated with any predefined objective to be optimized by the executed job of the evolutionary algorithm. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 304, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 314, which allocates the chromosomes to the slave processors 301 for objective function evaluation and/or constraint function evaluation by block 315. Once the objective function evaluations evaluation in block 315 have been completed, and the objective function values have been received in block 314, then each of the randomly generated parent chromosome data structures may be associated with a respective plurality of objective function values.

Having received or obtained the initial population of parent chromosome data structures in block 304, processing may then proceed to block 306. In block 306, the master processor 300 may select pairs of parent chromosome data structures from the input population of parent chromosome data structures of launch parameters. In an example embodiment of the disclosure, the selection of the pairs of parent chromosome launch parameter data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 306. It will be appreciated that a predetermined number of pairs of parent chromosome data structures may be selected in block 306. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 306, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 308 and 310. For example, block 308 illustrates a crossover evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 310 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 308 and 310 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 308 while a second predetermined portion or percentage (e.g., 1%-3%) of the received chromosomes of the chromosome data structures may have genes that are mutated in block 310. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 308 and 310 may be available without departing from example embodiments of the disclosure. Likewise blocks 308 and 310 may be performed in a different order than that shown in FIG. 3 or otherwise combined into a single block without departing from example embodiments of the disclosure.

After the evolutionary operations of block 306, 308, and 310, a new population of child chromosome data structures (i.e. launch parameters to be evaluated) may be obtained in block 312. Following block 312, processing may proceed to block 314. In block 314, the new population of child chromosome data structures may be received into a "To Evaluate" list or queue (see also FIG. 5, which illustrates block 314 in further detail). Block 314 may then allocate the chromosome data structures from the "To Evaluate" list or queue to the plurality of slave processors 301 according to an asynchronous evolution process. An automated chromosome bundling process may also be utilized in block 314 to determine how many chromosome data structures should be included in a respective chromosome bundle for a respective slave processor 301. For example, a slave processor 301 with faster processing capability may receive a chromosome bundle with a larger number of chromosome data structures. Alternatively, the slave processor 301 may receive a fixed number of launch parameters sets in the form of chromosome data structures in a chromosome bundle, but simply receive a larger number of chromosome bundles within a predetermined amount of time. The example automated chromosome bundling process may allow efficient allocation of chromosome data structures among the plurality of slave processors 301. In some cases, the number of flags, indicating the number of genes that are permitted to be considered as deviating from the baseline solution chromosome, may be considered in the bundling process.

In block 315, each slave processor 301 may have received a chromosome bundle comprising one or more chromosome data structures from the master processor 300. Additionally, in certain embodiments, the slave processors 301 may further receive a baseline chromosome or solution organized in any manner, representing a known solution. The slave processors 301 may be homogenous or heterogeneous in processing capability. Each slave processor 301 may evaluate, in accordance with a plurality of objective functions, the received chromosome bundle of chromosome data structures, and/or the baseline solution chromosome to generate a plurality of respective objective function values for each chromosome data structure in block 315. In some example embodiments, the slave processors 301 may further perform the functions of constraint minimization. The slave processors 301, therefore, in example embodiments, receive a solution to be both constraint minimization driving, in addition to objective value determination. In addition, each slave processor 301 may also perform timing operations or calculations, including determination of certain wait times and/or evaluation times associated with the respective slave processor 301, in block 315. As each slave processor 301 finishes the objective function evaluations and/or timing operations in block 315, the slave processor 301 may provide a results bundle (e.g., objective function values) and timing data (e.g., wait times and/or objective function evaluation times) to the master processor 300. The slave processor 301 may further receive, in example embodiments, a constraint violated solution and return a constraint non-violated solution to the master processor 300. As a result, the constraint minimization engine may be implemented on the slave processors 301 in accordance with example embodiments. In some of these example embodiments, the slave processors 301 may further provide objective values, as determined using the objective models 120, along with the non-constraint solutions. The master processor 300 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 301. Indeed, the evolutionary process may be asynchronous in that as soon as the "To Evaluate" list is empty for a given generation/iteration 321, the processing taking place in block 314 is completed, where the child population passed to block 316 is comprised of all of the chromosome data structures currently within the "Finished" list. It will be further appreciated that the results from some of the chromosome bundles previously sent to the various slave processors 301 may not have been received at the time the "To Evaluate" list is emptied. These may be referred to as late chromosome data structures from one or more prior generations/iterations.

In block 316, the master processor 300 may receive a modified child population of chromosome data structures from the asynchronous evolution process of block 314. In certain embodiments, the modified child population may include different chromosome structures as well as a different number of chromosome data structures as compared to the child population of block 312. The received modified child population is merged with the current parent population, as illustrated by block 316. In block 318, the master processor 300 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, non-domination sorting in block 318 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 302 or another archive of a computer memory or other data storage for subsequent retrieval. At this point, the solutions (e.g., chromosomes), as stored in the checkpoint 302, may be generated based at least in part on both objective function based evaluation of the objective optimization engine 210 and constraint minimization based evaluation of the constraint minimization engine 220.

Following processing in block 318, processing may proceed to block 319. In block 319, a determination is made as to whether the current job is completed such that the evolutionary algorithm should be terminated. A job typically comprises processing involving a plurality of connected runs 322, where each run 322 may include processing associated with one or more generations/iterations 321. Block 319 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 319 determines that the job is not complete, then processing may proceed to block 320 to determine whether the current run 322 has completed. In determining whether the current run is complete, block 320 may determine whether a current run 322 has failed to produce improvement in quantity and quality of the solutions generated from the prior iterations/generations 321. The quantity measure may be based upon the number of solutions. The quality measure may be based on some quantification of distance from a utopia point, box fitness, or yet another measure.

If block 320 determines that a current run 322 is not complete, then processing may proceed to block 323, wherein a population of parent chromosome structures may be obtained or otherwise selected from the elite chromosome data structures determined from block 318. The prior process may then be repeated for another generation/iteration 321 using the parent chromosome data structures from the prior generation/iteration. It will be appreciated that because the evolution process of block 314 is asynchronous, there may be one or more late child chromosome data structures received in the "Finished" list or queue in 316 that are associated with one or more pairs of parent chromosome data structures allocated to slave processors 301 during one or more prior generations/iterations. Therefore, in the next generation/iteration 321, the merged children chromosome data structures in block 316 may likewise include those late child chromosome data structures as well as current child chromosome data structures from parent chromosome data structures allocated to slave processors 301 during the current generation/iteration 321.

On the other hand, block 320 may determine that a current run 322 is complete. For example, looking back over a predetermined number of generations, the search may have failed to produce improvement in the solutions during each generation/iteration 321 of the current run 322. Improvement may be based upon the quantity of the solutions (e.g., the number of solutions) and the quality of the solutions (e.g., some quantification of distance from a utopia point, box fitness, etc.). In this case, the current run 322 may be completed, and processing proceeds to initiate a subsequent run 322. The subsequent run 322 may generate an initial population by invigorating the elite solutions stored in the archive checkpoint 302. In particular, the subsequent run 322 may utilize a first number of the elite solutions from the archive checkpoint 302 as part of the initial population utilized in block 304, but may also invigorate the initial population by adding a second number of randomly generated parent chromosome data structures. In example embodiments, the elite solutions may be non-constraint solutions. In example embodiments, the elite solutions may be non-constraint due to the constraint optimization and driving process, as performed by the constraint minimization engine 220. The randomly generated parent chromosome data structures may be generated and evaluated using the example processes discussed with respect to blocks 304 and 314.

In some example embodiments, the processors 300, 301 of the multi-tiered optimization system 130 may be implemented as appropriate in hardware, software, firmware, or combinations thereof. Software or firmware implementations of the processors 300, 301 may include computer-executable or machine-executable instructions written in any suitable programming language to perform the various functions described. Hardware implementations of the processors 300, 301 may be configured to execute computer-executable or machine-executable instructions to perform the various functions described. The one or more processors 300, 310 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The multi-tiered optimization system 130 may also include a chipset (not shown) for controlling communication between the one or more processors 300, 301 and one or more of the other components of the s multi-tiered optimization system 130. The one or more processors 300, 301 may also include one or more application specific integrated circuits (ASICs) or application specific standard products (ASSPs) for handling specific data processing functions or tasks. In example embodiments, the multi-tiered optimization system 130 may further include input/output (I/O) device(s) such as display screen(s), touch sensitive display screen(s), speaker(s), haptic device(s), or the like, may be controlled via one or more I/O device interfaces.

The multi-tiered optimization system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the multi-tiered optimization system 130 may be optimized for multiple objectives, while being viable (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 4A:
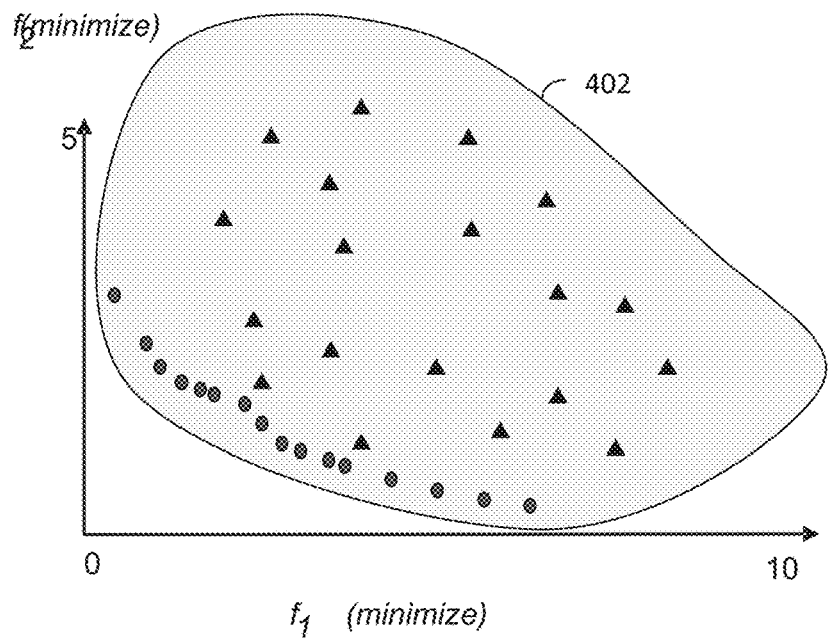
FIGS. 4A and 4B are charts illustrating an example pareto-optimized solution to a multi-objective problem, in accordance with embodiments of the disclosure.
Figure 4B:
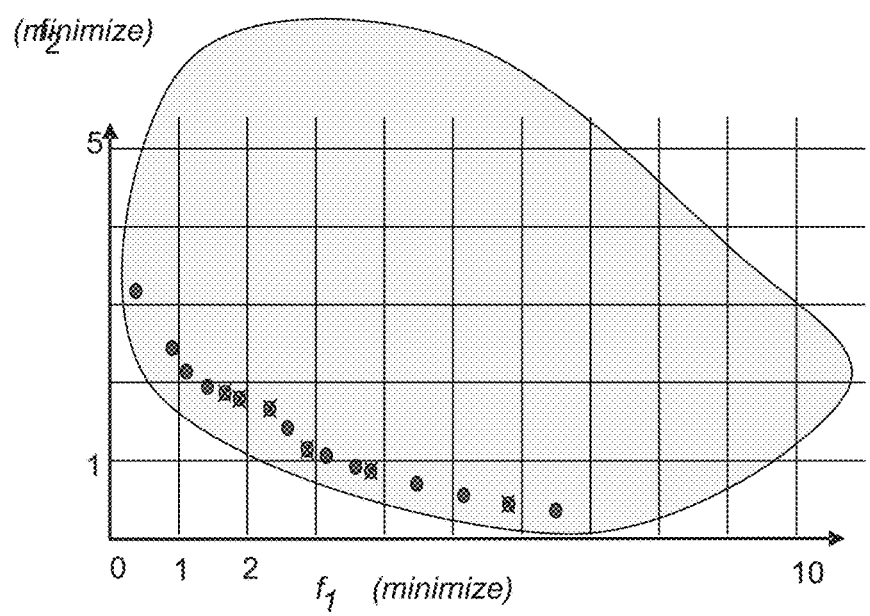

FIGS. 4A and 4B are charts illustrating an example pareto-optimized solution to a multi-objective problem, in accordance with embodiments of the disclosure. Initially, a first non-domination sorting may be applied to the current population 402 to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\varepsilon_1$ associated with objective function $f_1$, and a second epsilon value may be associated with second epsilon spacing or step size $\varepsilon_2$ associated with objective function $f_2$. Each solution may then be associated with an epsilon vector or epsilon box address ($\varepsilon_1$, $\varepsilon_2$) corresponding to the first epsilon value and the second epsilon value. If two or more solutions have the same epsilon box address, then the epsilon non-domination sorting may retain a single solution per epsilon box address ($\varepsilon_1$, $\varepsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to profit and revenue in item pricing problems.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 4A illustrates a feasible design region 402 associated with a first objective function $f_1$ and a second objective function $f_2$. Within the feasible design region is a snapshot of a population of solutions of a given generation/iteration, according to an example embodiment of the invention. Solutions in the feasible region 402 may be found by the constraint minimization engine 220. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 4B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 4B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention. Additionally, the non-dominated solutions may be feasible due to the constrain minimization mechanism, as implemented by the constraint minimization engine 220.

Figure 5:
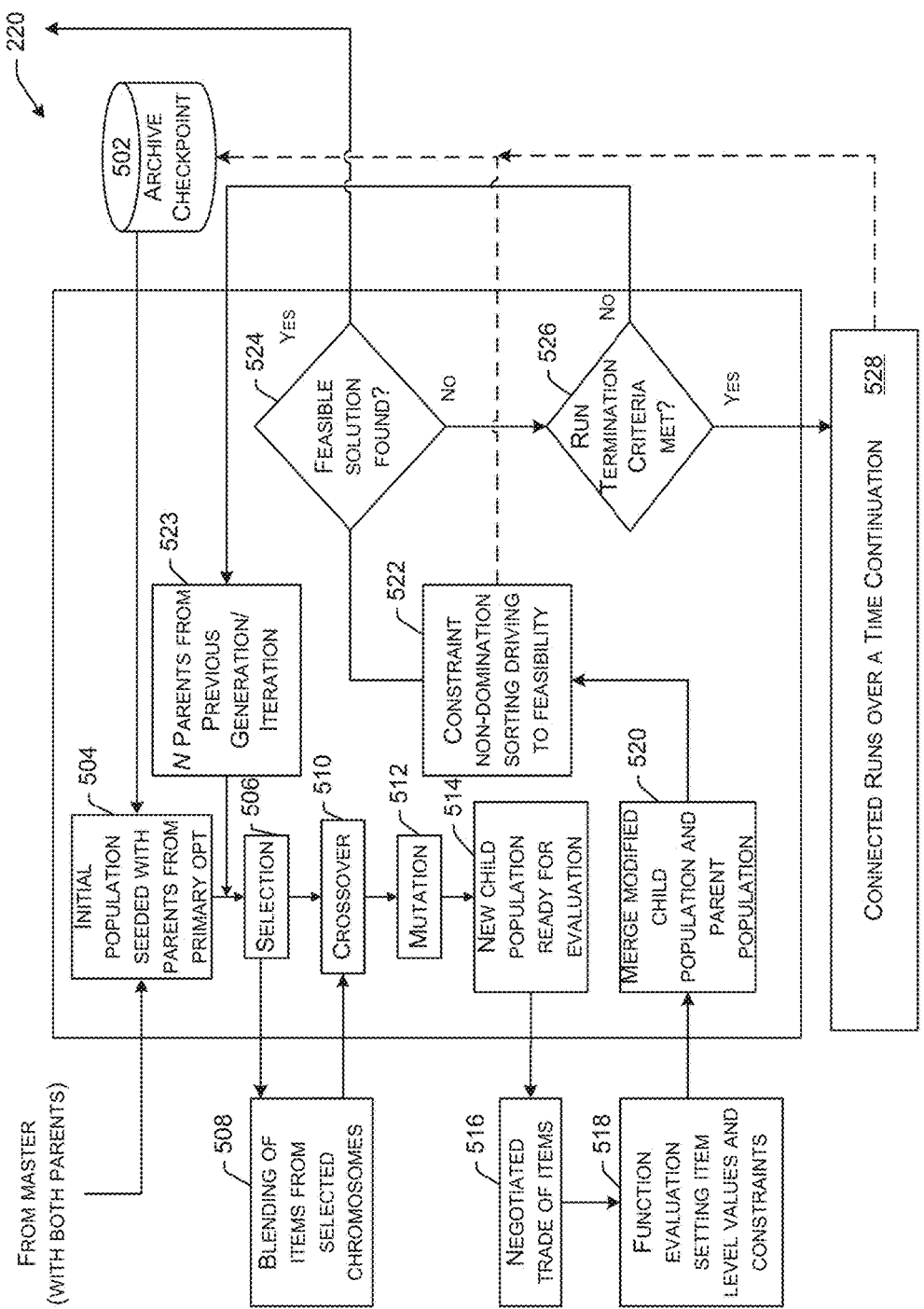
FIG. 5 is a block diagram that illustrates an example constraint optimization engine of the example multi-tiered optimization system of FIG. 2, in accordance with embodiments of the disclosure.

FIG. 5 is a block diagram that illustrates an example constraint optimization engine of the example multi-tiered optimization system of FIG. 2, in accordance with embodiments of the disclosure. In example embodiments, constraint optimization may be to reduce or eliminate constraint violations, or implementation of a constraint minimization engine 220. The constraint minimization engine may receive one or more parent solutions from the master processor 300 on which the objective optimization engine 210 is implemented. The received solutions, in example embodiments, may be stored in the archive checkpoint 502 and/or provided to block 504 as an initial population seeded with parents from the primary optimization. The initial population, in some example embodiments, may be two parent solutions that are sent from the objective optimization engine 210. The archive checkpoint 502 may further be prepopulated with other potential solutions, such as, for example feasible solutions from one or more previous constraint minimization processes.

Next, a selection process may be performed at block 506. Next, at block 506, a blending of items from selected chromosomes may be performed. The selection process may be substantially similar to the selection process used in block 306 of the objective optimization engine 210. If the initial population only contains two solutions, then the selection process may be to select the only two solutions, such as on a first iteration of this constraint minimization process. In subsequent iterations and/or if the initial population of solutions do contain more than two solutions, then a two solutions that are most "fit for survival" may be selected. The best solutions may be selected in a tournament fashion between pairs of randomly selected solutions, as used in the selection process 306 of the objective optimization engine 210 performed on the master processors 300.

A blending process of block 508 may be used to generate a child population from the parent population as received at block 504 and/or other solutions that may have been available in the archive checkpoint 502. The child solutions may be generated in the blending process by each solution having its initial assignment of items by blending the associated items from each of the parent's buckets. In other words, item assignments to categories in two of the solutions, as selected by the selection process of block 506, may be mixed to generate one or more blended child solutions. It is not known, at this point, if the generated child solutions are feasible. Indeed, it may not even be known, a priori, if the received parent solutions at block 504 are feasible.

At block 510, crossover process may be performed. This process may be substantially similar to the crossover process of block 308 of the objective optimization engine 210. At block 510, crossover process may be performed. This process may be substantially similar to the crossover process of block 308 of the objective optimization engine 210. Indeed, in the context of blocks 510 and 512, instead of a data structure with the decision variables represented as genes in a chromosome, as in the case of the objective optimization engine 210, in this case, the data structure may be an allocation of items as allocated to various categories. After the evolutionary processes (e.g., selection 506, blending 508, crossover 510, and mutation 512) are performed, a new child population of solutions may be ready for evaluation at block 514.

The child solutions at block 514 may be applied to the one or more constraint functions/models to determine numerical and/or Boolean values associated with each of the items as allocated to categories in each of the child solutions of the new population of block 514. It may be determined therefrom, if any of the constraint values violate any constraint thresholds. For example, consider a pricing problem, where a particular item may be allocated to a particular category or price bin. Then the constraint value may be a value associated with demand for that item at the price for which that item is allocated. If the demand is found not meet a threshold condition, then it may be determined that the item allocation violates a constraint. In this example, consider that the demand is to be between 85% and 100% for all items and the demand is found to be 104% at the items current category allocation, then it would be determined that the item allocation violates a constraint. The demand value (e.g., 104% may be determined for the item using one or more constraint functions/models 120. If no constraints are violated for all of the item allocations of a particular solution, then that solutions would be deemed feasible. In highly constraint problems, such as many pricing problems, it may be common to find that none of the new population 514 of child solutions are feasible upon generation of the same.

At block 516, negotiated trading of items across categories may be performed. In example embodiments, if a particular child solution is found to be non-feasible (e.g., one or more item allocations of the child solution results in a constraint violation), then a trading process may be carried out to minimize and/or eliminate the constraint violation. The constraint violations may be determined by using the constraint models 120 to identify parameter values (e.g., demand for a product, room occupancy of hotel rooms, level of sales of plane tickets, etc.) that can be compared threshold values (e.g., occupancy targets between 80% and 100%, plane ticket sales targets between 90% and 105%, etc.). The mechanism of trading items to drive to greater feasibility is discussed further in conjunction with FIG. 7.

At block 518, function evaluation may be performed to set item level constraint values. The set of modified (e.g., modified by item level trading) child solutions may be applied to the constraint value models to determine item level constraint values and/or indications of item level constraint violations for each of the modified solutions. This set of item level values and/or indication of constraint violations may subsequently be used to identify those solutions that do not have any constraint violations (e.g., are feasible) or have fewer constraint violations or less out-of-bound solutions than other modified solutions in the population. At block 520, the modified child population and parent population may be merged. In this merging, the number of solutions that may be ranked against each other to cull out the most feasible of them may be increased.

At block 522, constraint non-domination sorting may be performed. This process may be similar to the process 318 of the multi-objective engine 210, as described in conjunction with FIG. 3. The non-domination sorting of solutions, in this case, may involve sorting the solutions in a manner where the most feasible solutions are to be identified to be more feasible than the other of the solutions. In other words, a solution that is feasible from the sense of applying one or more constraint evaluations to each of the items that have been allocated as part of the a particular solution, may be ranked higher than a solution that has multiple constraint violations. All of the population of solutions at block 520 may be sorted and ranked on a non-domination basis (e.g., is more optimized on the basis of a constraint metric, without being any worse on another constraint metric). At block 524, it may be determined if a feasible solution is found. A feasible solution, for the purposes of this discussion, is one where there are no item level constraint violations for any of the items as allocated in categories for that solutions and across any constraint metrics used for checking constraint violations. If a feasible solution is found, then that solution may be sent back to the objective optimization engine 210.

If at block 524 it is determined that a feasible solution had not been found, then at block 526, it may be determined if a run termination criteria had been met. In some example embodiments, a run termination criteria may be met if it no feasible solution is found after a predetermined number of iterations of the processes as depicted in FIG. 5. In other example embodiments, a run termination criteria may be triggered if, as a result of the sorting at block 522, the parent chromosomes continue to be the most feasible solutions over a predetermined number of iterations. If it is determined that a run termination criteria had been met, then the constraint minimization process as performed by the constraint minimization engine 220 may be terminated, even if a feasible solution is not found. In some example embodiments, if the run is terminated without finding a feasible solution, no solution may be sent back to the objective optimization engine 210. In other example embodiments, one or more of the most feasible (e.g., least constraint) solutions may be returned to the objective optimization engine 210. By returning a more feasible solution, even if it is not completely feasible, there may be drive towards greater feasibility and greater feasibility may lead to greater robustness and implementation of a final optimized solution, in example embodiments, even if the solution is not fully feasible.

If at block 526 it is determined that the run termination criteria is not met, then there may be a return to block 523. In some example embodiments, one or more of the most feasible solutions may be saved at the archive checkpoint 502. At block 523, a certain number (N) parents from the previous generation/iteration may be provided for further iteration and driving to feasibility. At this point the evolutionary processes (selection 506, crossover 510, blending 508, mutation 512) may again be applied, as described above, to generate a new set of child solutions to be evaluated and driven to feasibility, if possible. A job typically may include processing involving a plurality of connected runs 528, where each run 528 may include processing associated with one or more generations/iterations.

Figure 6:
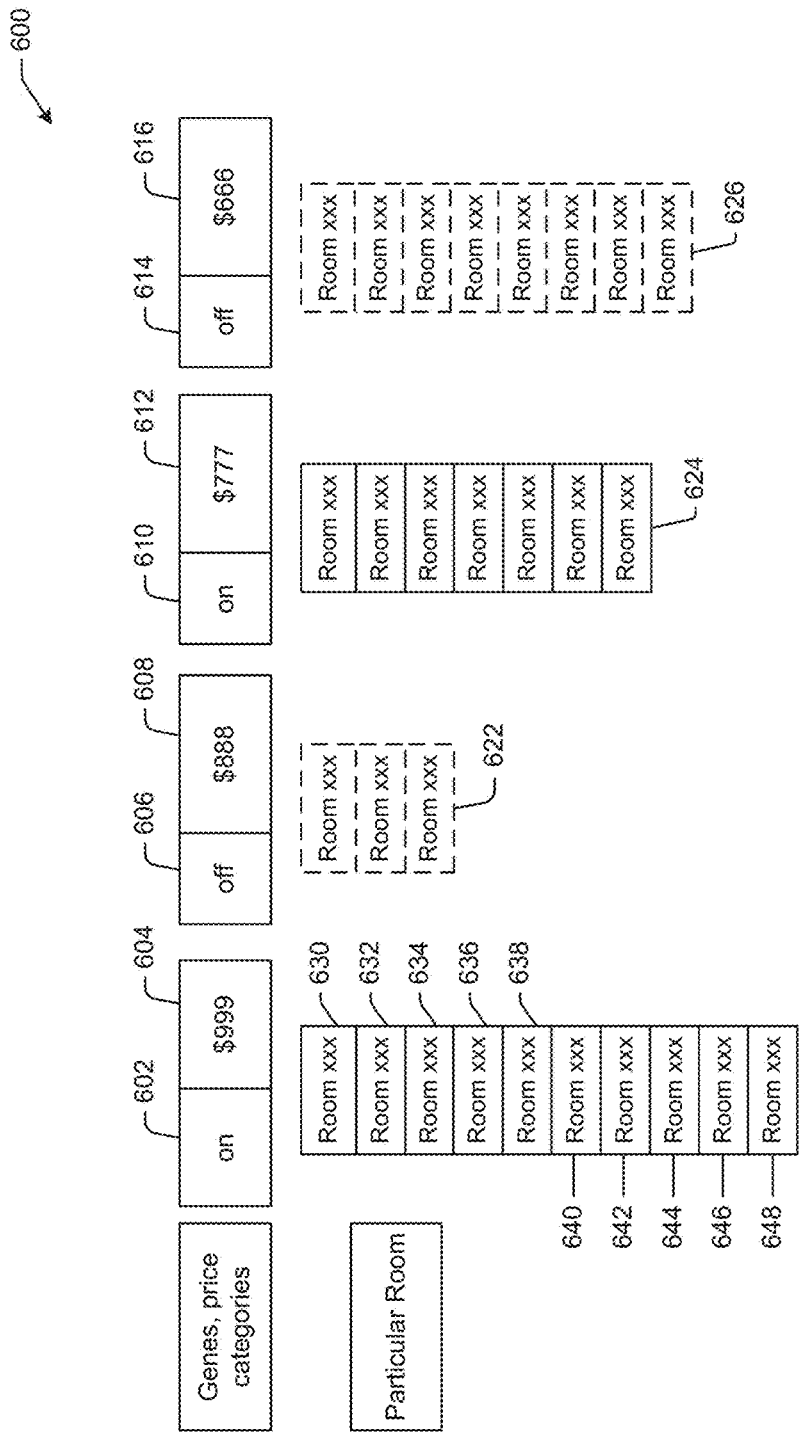
FIG. 6 is a schematic diagram that illustrates an example allocation of items in a variety of categories for optimizing one or more objectives, in accordance with embodiments of the disclosure.

FIG. 6 is a schematic diagram that illustrates an example allocation 600 of items in a variety of categories for optimizing one or more objectives, in accordance with embodiments of the disclosure. This allocation 600 may be representative of a solution that may be used by each of the constraint minimization engine 220 and/or the objective optimization engine 210 to minimize constraint violations and/or optimize according to multiple objectives, respectively. This allocation 600, for the objective optimization engine 210 may be represented as a chromosome with multiple genes representing each of the items 630, 632, 634, 636, 638, 640, 642, 644, 646, 648, 624, 626 with a price corresponding to a category 604, 608, 612, 616. For the constraint minimization engine 220, this allocation 600 may be represented as is depicted FIG. 6 with a number of items allocated to one or more respective categories. Categories, in example embodiments, may have a Boolean flag 602, 606, 610, 614 associated therewith to turn a category on or off.

In the example of FIG. 6, different types of hotel rooms may be each of the items and a therefore allocated to one or more categories as shown. The different types of hotel rooms may be, for example, in various locations, various sizes, various views, various bed sizes, various other amenities, various additional services, various package deals, or the like. For example, a particular item attribute may be "London-City View-Upper Floor-Queen Bed-Spa Package for 2." Another example item may be "Gary, Ind.-Highway View-Twin Bed-Continental Breakfast."

As shown, each of the different types of rooms may be allocated to a particular category 604, 608, 612, 616. In this particular solution, the allocation 600 may turn off the categories 608, 616 by setting the respective Boolean flag to "off." In this way, the allocation 600 may have a variable number of categories. Each of the categories may have a parameter (e.g., price) associated with it. Therefore, each of the items (e.g., room types) allocated to a particular category will, according to the solution and the corresponding allocation 600, have the price of that category. For example, with this allocation, room type 636 has a price of $999 per night. As another example, each of the room types of 624 may have a price of $777 per night.

Once all of the items (e.g., room types) are allocated to one or more categories, an item-by-item assessment may be performed to determine if a constraint violation arises. For example, there may be models 120 associated with each of the different items that indicate the occupancy of that room type at particular prices, at particular times of the year, at particular times of the week, at particular times of the year, etc. These models 120 may be used to project the room occupancy for the current category allocation of that item. For example a model may be able to predict that a particular room is estimated to have an occupancy of 110% at the current category allocation. If the allowable limits are set, for example between a range of 80% and 100%, then an estimated 110% occupancy would trigger a constraint violation. As a result, with a current allocation of items to categories for the current solution, it may be determined that the solution is not feasible because at least one item violates a constraint. If this particular item was to be traded to another category, perhaps a category of a higher price, then the item may no longer generate a constraint violation.

As discussed above, the constraint minimization engine 220, upon generating a population of child chromosomes, such as at blocks 514 and/or 520 of the constraint minimization mechanism, may be configured to determine if any constraint violations exist for any of the items of any of the allocations of the various solutions (e.g., child population). If a particular allocation is evaluated to not have any items that result in a constraint violation, then that allocation or solution may be deemed feasible. Such as feasible allocation may be returned to the objective optimization engine as a feasible solution. In example embodiments, if a particular child solution is found to be non-feasible (e.g., one or more item allocations of the child solution results in a constraint violation), then a trading process may be carried out, such as at block 516 of the constraint minimization engine 220 of FIG. 5 to reduce and/or eliminate any item level constraint violation(s) to drive to feasible solutions. The mechanism of trading items to drive to greater feasibility is discussed further in conjunction with FIG. 7.

Figure 7:
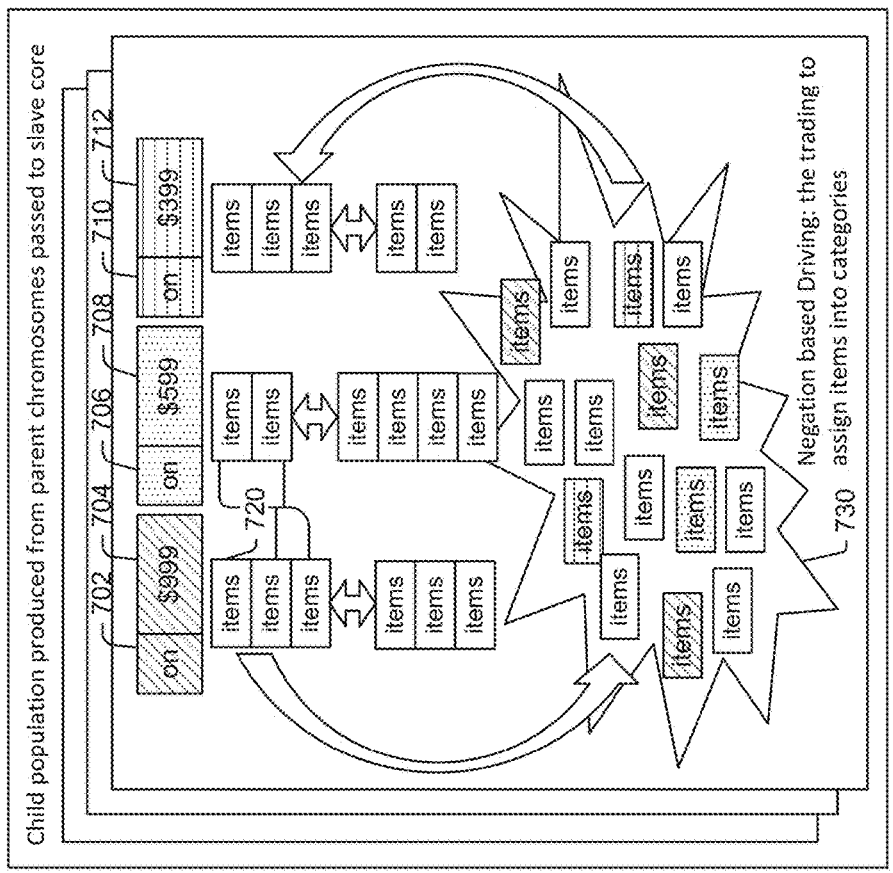
FIG. 7 is a schematic diagram that illustrates an example trading mechanism by which items get allocated to categories to reduce the level of constraints, in accordance with embodiments of the disclosure.

FIG. 7 is a schematic diagram that illustrates an example trading mechanism by which items get allocated to categories to reduce the level of constraints, in accordance with embodiments of the disclosure. As shown, there may be a plurality of categories 704, 708, 712 with associated Boolean flags 702, 706, 710 to indicate if those categories are active and available in the particular solution allocation that is being driven towards feasibility in FIG. 7. Each of the categories 704, 708, 712 may have one or more items allocated to them. These items may take on the attributes of its corresponding category. For example, the items in category 704 may be priced at $999. It may be determined, in example embodiments, if at an item level a constraint violation exists. If a constraint violation does exist for a particular item, as determined using constraint models 120, then the item may be provided to a trading platform 730 for the purposes of trading or moving to a different category, where the item level constraint may no longer exist. For example, if a particular item has a constraint violation in category 704, then that item may be reallocated to category 708 and the upon doing so, the constraint violation may no longer exist. In a similar example, suppose that a particular item allocated to category 712 has a constraint violation, that item may be reallocated to category 704 to remove the constraint violation.

With continued reference to the hotel room item example as discussed above, where constraint violations occur if a particular item (e.g., type of hotel room) has a predicted occupancy rate that is less than 80% (e.g., too few people want to rent the rooms) or greater than 100% (e.g., too many people want to rent the rooms), the trading platform 730 may be used to reduce/eliminate item level constraint violations. For example, if a particular room type is currently allocated to category 704 (e.g., costs $999 per night) and has a projected occupancy of 50%, then that room type is allocated in a manner where there is a constraint violation, rendering the solution in which it is included as unfeasible. In example embodiments, the item may be traded by allocating it to the category 708. In so doing the projected occupancy may be 90%, thereby no longer posing a constraint violation. As a result, the solution in which that item is included is driven to a greater level of feasibility.

In example embodiments, there may be a "bucket manager" or a set of logic functions associated with each of the categories for the purposes of performing trades of items to drive to greater levels of feasibility. In this way, the bucket managers may perform the trades to reassign items in a manner to remove/reduce constraint violations. The bucket managers, in example embodiments, may select items in their category that may have or are likely to have constraint violations and trade those items to other bucket to reduce the likelihood of constraint violations. In other example embodiments, the bucket managers may select items for the purpose of trading in a relatively random manner. In some cases, the bucket managers may trade items in a manner such that the relative value in each of the buckets is relatively constant. The bucket managers may then receive one or more items from the trade floor 730 as allocated to reduce any item level constraint violations. Therefore, the bucket managers continue in this process of pushing items to the trade floor 730 and receive items from the trade floor, until all the items have been reallocated. In some cases, the reallocation may lead to a greater level of feasibility or a fully feasible solution. The functionality of the bucket manager, in example embodiments, may performed by executing corresponding instructions on the slave processors 301 of the constraint minimization engine 220.

In example embodiments, there may be a "trade manager" that provides some logic to the process of trading and/or reallocating items between categories. This trade manager may run the trade floor 730 by accepting items that have constraint violations when allocated to its current category allocation. The trade manager may then reallocate the times that it may have on the trading floor 730. In some example embodiments, the trade manager may reallocate the items based at least in part in maintaining or nearly maintaining the overall value of each of the categories. In other example embodiments, the trade manager may simply drive the items to allocations that are most likely to result in the greatest improvement in feasibility (e.g., greatest reduction in constraint violations). The trade manager may also receive and/or determine information about what type or reallocation of a particular received item would result in improved feasibility or the complete removal of any constraints associated with that item. In other words, the trade manager may be configured to identify if a particular item allocation was violating an upper threshold or a lower threshold condition and, in some cases, by what magnitude. Based at least in part on this information, the trade manager may be configured to best drive the trade by reallocating that particular item in a more logic driven manner to more effectively and/or efficiently eliminate any constraint violations. The functionality of the trade manager, in example embodiments, may be performed by executing corresponding instructions on the slave processors 301 of the constraint minimization engine 220.

Figure 8:
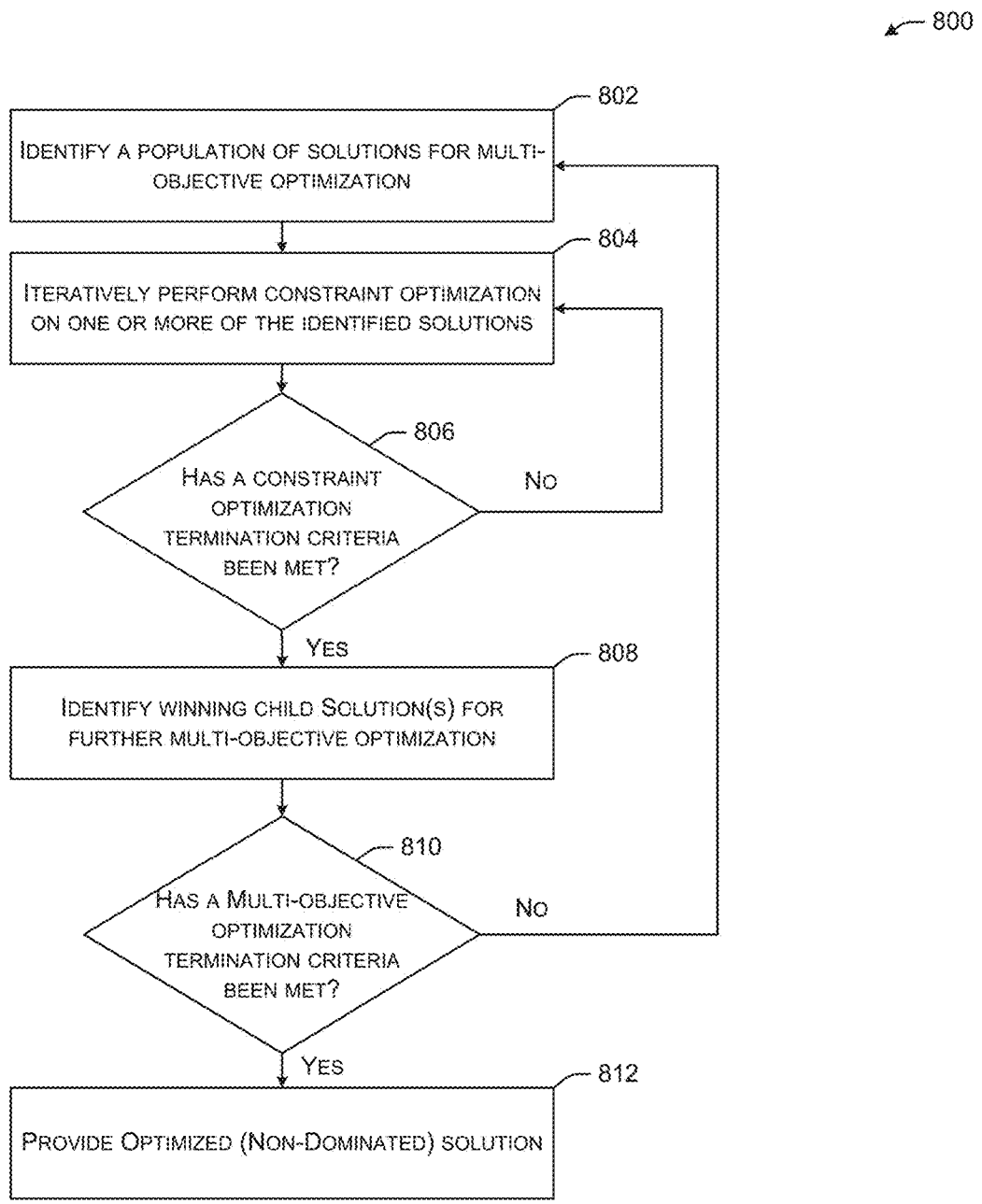
FIG. 8 is a flow diagram that illustrates an example method for providing an optimized solution from the multi-tiered optimization system of FIG. 1, in accordance with embodiments of the disclosure.

FIG. 8 is a flow diagram that illustrates an example method 800 for providing an optimized solution from the multi-tier optimization system 130 of FIG. 1, in accordance with embodiments of the disclosure. Portions of this method 800 may be performed by the multi-objective optimization engine 210 and other portions of the method 800 may be performed by the constraint minimization engine 220. At block 802, a population of solutions for multi-objective optimization may be identified. This may be an initial starting point for the MOEA process.

At block 804, constraint optimization may be performed on one or more of identified solutions. This may be performed by sending the one or more identified solutions, or a subset thereof, to the constraint minimization engine 220 to generate a population of child solutions by a variety of evolutionary processes, such as selection, blending, crossover, and/or mutation. After generating a variety of solutions to evaluate, an evaluation, from a constraint violation standpoint, may be performed and the allocations may be modified by trading items across categories to drive toward reduced constraint violations (e.g., greater feasibility) of the population of solutions to be evaluated. As described above, the trades between categories may be performed so that if an item is found to have a constraint violation in a first category allocation, then that item may be reallocated to a second category where the item no longer exhibits a constraint violation.

At block 806, it may be determined if a constraint optimization termination criteria has been met. In some example embodiments, the constraint optimization termination criteria may include identifying a feasible solution. Therefore, if a feasible solution, as determined by the constraint minimization engine 220, is generated then that solution may trigger a constraint termination criteria. If it is determined at block 806, that a constraint optimization criteria has not been met, then the method 800 may return to block 804, where the constraint optimization may be performed on another population of identified solutions.

At block 806, if it is determined that a termination criteria had been met, then at block 808, one or more winning child solutions may be identified for further multi-objective optimization. The child solution may be provided to the multi-objective optimization engine 210 for the purposes of multi-objective optimization. This process may involve generating a variety of further child populations in the multi-objective optimization engine 210 for evaluation according to one or more objective models.

At block 810, it may be determined if a multi-objective termination criteria had been met. The multi-objective termination criteria, in example embodiments, may be met if a non-dominated solution has been found. If at block 810, it is determined that a multi-objective termination criteria had not been met, then the method may return to block 802, where a population of chromosomes for multi-objective optimization may be identified to include solutions from the previous generations. If at block 810 a multi-objective optimization termination criteria has been met, then at block 812, the optimized solution may be presented.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
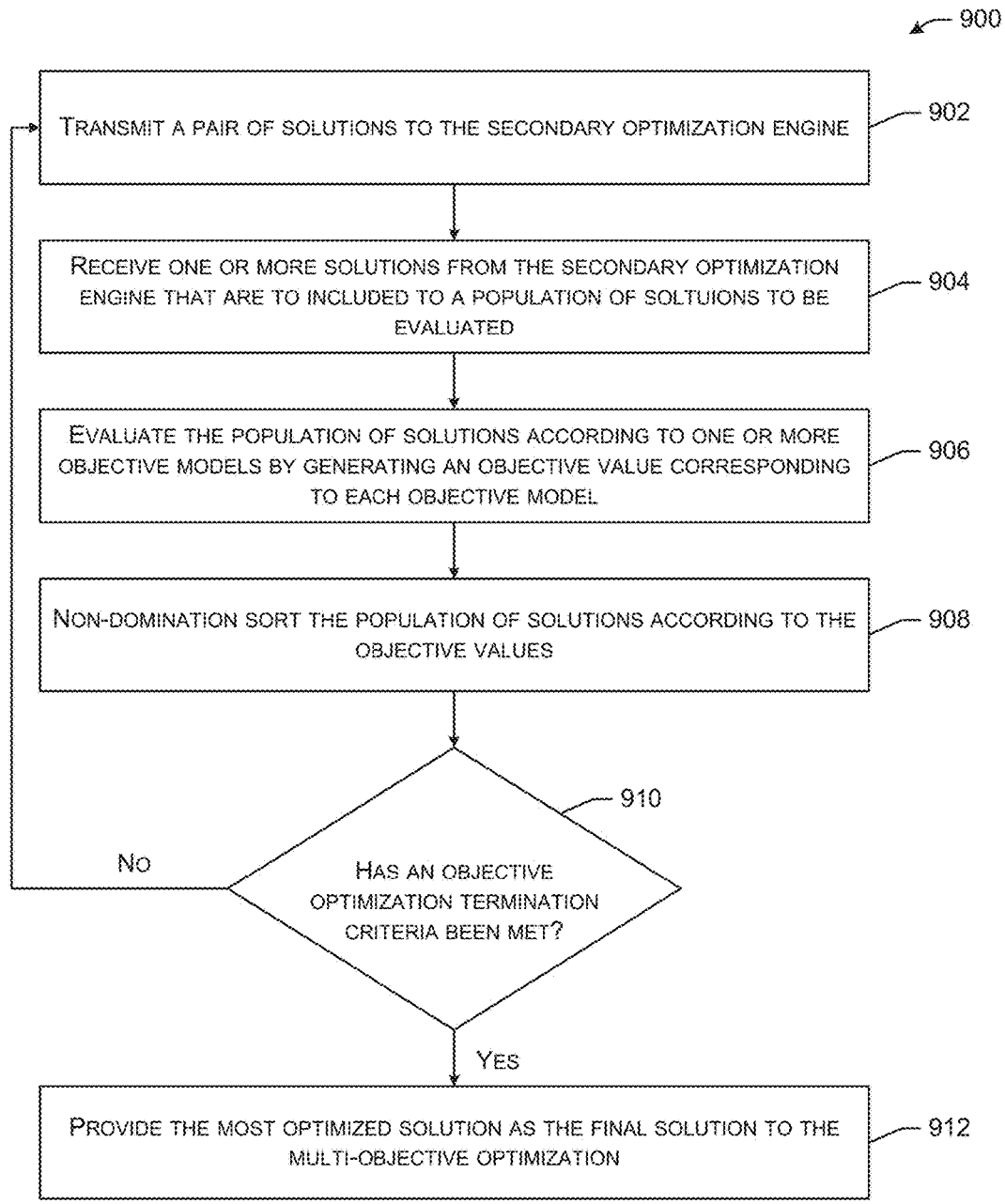
FIG. 9 is a flow diagram that illustrates an example method for providing an optimized solution to a multi-objective optimization problem, in accordance with embodiments of the disclosure.

FIG. 9 is a flow diagram that illustrates an example method 900 for providing an optimized solution to a multi-objective optimization problem, in accordance with embodiments of the disclosure. This method 900, in example embodiments, may be performed by the multi-objective optimization engine 210 operating on the master processors 300.

At block 902, a pair of solutions may be transmitted to the secondary optimization engine or constraint minimization engine. In example embodiments, the solutions may be sent as a chromosome data structure. In other example embodiments, the solutions may be sent in the form of an allocation of items to particular categories. The pair of solutions may ones that were deemed to survive from the previous generation or generated based at least in part on solutions that survived from the previous generation of the multi-objective optimization in the objective optimization engine 210. At the beginning of the multi-objective optimization process (e.g., when solutions from the previous generation are not yet available), the solutions that may be transmitted may be known solutions and/or best-guesses at a known solution (e.g., a solution that may not yet be optimized). In some cases, the solutions provided to the constraint minimization engine 210 may already be feasible. In other cases, the solutions provided to the constraint minimization engine 210 may be unfeasible.

At block 904, one or more solutions may be received from the secondary optimization system and the one or more solutions are to be included in a population of solutions to be evaluated. These solutions, as received, may be received in the form of chromosome data structures or as an allocation of items to categories. If the decision variables are not arranged in a chromosome fashion, then a translation process may be performed to translate from an item allocation solution data structure to a gene-chromosome solution data structure. In example embodiments, the received solutions may be feasible. In other example embodiments, one or more of the received solutions may not be feasible, but may be more feasible than the parent solutions sent to the constraint minimization engine 220 at block 902.

At block 906, the population of solutions may be evaluated according to one or more objective models by generating an objective value corresponding to each objective model for each of the solutions. The population of solutions at this point may include the one or more solutions that were received from the constraint minimization engine 220. In some example embodiments, child solutions may be derived, at least in part from the receive solutions form the constraint minimization engine 220 as part of the population of solutions to be evaluated. These child solutions, in example embodiments, may be generated using one or more evolutionary operators (e.g., selection, crossover, mutation). Each of the solutions with their respective objective values may be available once the objective models 120 are applied to the solutions.

At block 908, the population of solutions may be non-domination sorted according to the respective objective values. As a result, the best solutions to be propagated to future generations may be identified based at least in part on the non-domination sorting. As described above, non-domination sorting may entail finding a solution that performs better than other solutions (e.g., from the present generation and prior generations) on the basis of at least one objective and no worse than other solutions on the basis of all other objectives.

At block 910, it may be determined if an objective optimization termination criteria has been met. In example embodiments, an objective optimization termination criteria may be met if further non-dominated solutions have not been discovered in a predetermined number of previous generations of the MOEA method. If it is determined that the objective optimization termination criteria has not been met, then at block 902, another pair of solutions may be transmitted to the secondary optimization engine, so that the secondary optimization engine 220 may perform constraint minimization processes that return a feasible, or at least a more feasible solution for further objective evaluation. At block 910, if it is determined that objective optimization criteria has been met, then at block 912, the most optimized solution may be presented as a final solution to the multi-objective optimization.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

Figure 10:
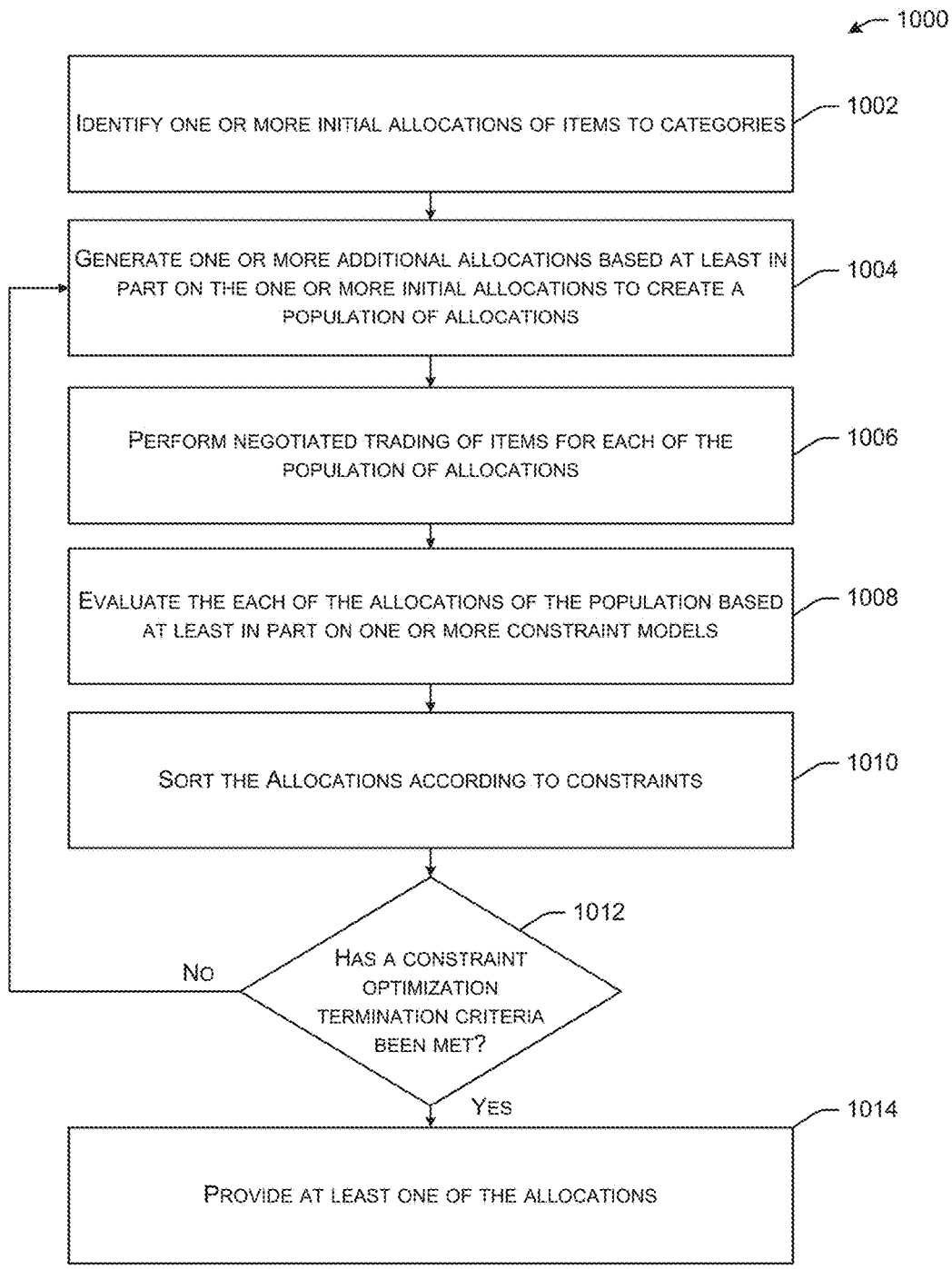
FIG. 10 is a flow diagram that illustrates an example method for providing an allocation of items to categories by the secondary optimization engine, in accordance with embodiments of the disclosure.

FIG. 10 is a flow diagram that illustrates an example method 1000 for providing an allocation of items to categories by the secondary optimization engine 220, in accordance with embodiments of the disclosure. This method 1000 may be performed on the slave processors 301 of the multi-tiered optimization system 130, in example embodiments.

At block 1002, one or more initial allocations of items to categories may be identified. This allocation may be a starting point. In example embodiments, the initial allocation may be received from the objective optimization engine 210 as solutions that is to be evaluated for constraint violation and/or used to generate solutions that exhibit reduced constraint violations (e.g., greater feasibility).

At block 1004, one or more additional allocations generated based at least in part on the one or more initial allocations to create a population of allocations. These additional allocations may be generated by any variety of evolutionary processes, such as selection, blending, crossover, mutations, or the like. These allocations may be generated from the initial allocations as those parent allocation may have already evolved from a feasibility and/or objective value standpoint (e.g., they may be pretty good starting points).

At block 1006, negotiation trading of items may be performed for each of the population of allocations. This may be performed to drive towards reduced constraint violations. This process may be assisted by bucket managers and/or trading mangers that assist in moving items that are causing constraint violations form one category to another category in an effort to reduce the constraint violations and thereby increase the feasibility. By a process of random reallocation of items and/or a logic driven reallocation process, the allocations may be modified in a manner such that the level of feasibility of the modified allocations are increased. This process is further described in conjunction with FIGS. 6 and 7.

At block 1008, each of the allocation of the population of allocations may be evaluated based at least in part on one or more constraint models. As a result, it may be determined if there are any resulting constraint violations associated with each of the allocations as solutions. At block 1010, the allocations may be sorted according to constraints. In other words, the solutions may be sorted according to the level of constraint violation (e.g., level of infeasibility).

At block 1012, it may be determined if a constraint optimization termination has been met. If it is determined that the constraint optimization termination criteria has not been met, then the method may return to block 1004, where one or more new allocations (e.g., solutions that are to be evaluated according to constraint violation conditions) of the next generation may be generated.

At block 1012, if the constraint optimization termination criteria had been met, then the method may proceed to block 1014, where at least one of the allocations may be provided. In this case, if there is only one feasible allocation, then that solution may be provided back to the objective optimization engine 210. If, on the other hand, there are more than one feasible solutions, then all of those solutions may be provided back to the objective optimization engine 210.

It should be noted that the method 1000 may be modified in various ways in accordance with certain embodiments. For example, one or more operations of the method 1000 may be eliminated or executed out of order in other embodiments. Additionally, other operations may be added to the method 1000 in accordance with other embodiments.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    identifying, by one or more processors, a plurality of items, including a first item and a second item;
    identifying, by the one or more processors, a plurality of categories, including a first category and a second category;
    providing, by the one or more processors, a first allocation of items by allocating the first item to the first category and the second item to the second category;
    identifying, by the one or more processors, one or more constraint models;
    determining, by the one or more processors and based at least in part on the one or more constraint models, that the first allocation of items is infeasible;
    providing, by the one or more processors and based at least in part on determining that the first allocation of items is infeasible, a second allocation of items by allocating the first item to a third category;
    determining, by the one or more processors and based at least in part on the one or more constraint models, that the second allocation is feasible;
    providing, by the one or more processors, the second allocation as a feasible solution to a multi-objective optimization problem; and
    performing, by the one or more processors, the multi-objective optimization problem using the second allocation.

2. The method of claim 1, further comprising:
    determining a first chromosome based at least in part on the second allocation;
    identifying at least one objective model;
    determining a set of objective values based at least in part on the at least one objective model and the first chromosome; and
    comparing the set of respective objective values to one or more other sets of respective objective values to determine that the first chromosome is an optimized solution to the multi-objective optimization problem.

3. The method of claim 2, wherein determining that the first chromosome is an optimized solution to the multi-objective optimization problem comprises:
    identifying that the respective objective values are not dominated by the one or more other sets of respective objective values.

4. The method of claim 1, wherein determining that the second allocation is feasible comprises:
    determining a first constraint value corresponding to the first item, based at least in part on the third category and the one or more constraint models;
    determining a second constraint value corresponding to the second item, based at least in part on the second category and the one or more constraint models;
    identifying that the first constraint value satisfies a first threshold condition; and
    identifying that the second constraint value satisfies a second threshold constraint.

5. The method of claim 4, wherein determining that the second allocation is feasible further comprises identifying that a plurality of items, including the first item and the second item, are allocated to respective categories, such that respective constraints corresponding to each of the plurality of items meets a respective threshold condition.

6. The method of claim 1, wherein the multi-objective optimization problem is a pricing problem and the first item is a first product type to be priced at a first price and the second item is a second product type that is to be priced at a second price, wherein the first price corresponds to the first category and the second price corresponds to the second category.

7. The method of claim 1, wherein the first allocation is generated based at least in part on a third allocation and a fourth allocation.

8. The method of claim 7, wherein the third allocation and fourth allocation are received from an objective optimization engine.

9. The method of claim 7, wherein the first allocation is generated by blending the third allocation and the fourth allocation, wherein blending comprises selecting one or more first item allocations selected from the third allocation and combining the one or more first item allocations with one or more second item allocations selected from the fourth allocation.

10. The method of claim 1, wherein determining that the first allocation of items is infeasible comprises determining that the first item allocated to the first category results in a constraint value that fails to meet a threshold condition and wherein providing the second allocation of items by allocating the first item to a third category is based at least in part on the determining that the first item allocated to the first category results in the constraint value that fails to meet the threshold condition.

11. A system, comprising:
    a memory that stores computer-executable instructions;
    at least one processor configured to access the memory, wherein the at least one processor is further configured to execute the computer-executable instructions to:
        identify a plurality of items, including a first item and a second item;
        identify a plurality of categories, including a first category and a second category;
        provide a first allocation of items by allocating the first item to the first category and the second item to the second category;
        identify one or more constraint models;
        determine, based at least in part on the one or more constraint models, that the first allocation of items is infeasible;
        provide, based at least in part on determining that the first allocation of items is infeasible, a second allocation of items by allocating the first item to a third category;
        determine, based at least in part on the one or more constraint models, that the second allocation is feasible;
        provide the second allocation as a feasible solution to a multi-objective optimization problem; and
        perform the multi-objective optimization problem using the second allocation.

12. The system of claim 11, wherein the at least one processor is further configured to execute the computer-executable instructions to:
    determine a first chromosome based at least in part on the second allocation;
    identify at least one objective model;

determine a set of objective values based at least in part on the at least one objective model and the first chromosome; and compare the set of respective objective values to one or more other sets of respective objective values to determine that the first chromosome is an optimized solution to the multi-objective optimization problem.

13. The system of claim 12, wherein the at least one processor to determine that the first chromosome is an optimized solution to the multi-objective optimization problem comprises the at least one processor to identify that the respective objective values are not dominated by the one or more other sets of respective objective values.

14. The system of claim 11, wherein the at least one processor to determine that the second allocation is feasible comprises the at least one processor to:

determine a first constraint value corresponding to the first item, based at least in part on the third category and the one or more constraint models;

determine a second constraint value corresponding to the second item, based at least in part on the second category and the one or more constraint models;

identify that the first constraint value satisfies a first threshold condition; and identify that the second constraint value satisfies a second threshold constraint.

15. The system of claim 14, wherein the at least one processor to determine that the second allocation is feasible further comprises the at least one processor to identify that a plurality of items, including the first item and the second item, are allocated to respective categories, such that respective constraints corresponding to each of the plurality of items meets a respective threshold condition.

16. The system of claim 11, wherein the multi-objective optimization problem is a pricing problem and the first item is a first product type to be priced at a first price and the second item is a second product type that is to be priced at a second price, wherein the first price corresponds to the first category and the second price corresponds to the second category.

17. The system of claim 11, wherein the first allocation is generated based at least in part on a third allocation and a fourth allocation.

18. The system of claim 17, wherein the third allocation and fourth allocation are received from an objective optimization engine.

19. The system of claim 17, wherein the first allocation is generated by blending the third allocation and the fourth allocation, wherein blending comprises selecting one or more first item allocations selected from the third allocation and combining the one or more first item allocations with one or more second item allocations selected from the fourth allocation.

20. The system of claim 11, wherein the at least one processor to determine that the first allocation of items is infeasible comprises the at least one processor to determine that the first item allocated to the first category results in a constraint value that fails to meet a threshold condition and wherein the at least one processor to provide the second allocation of items by allocating the first item to a third category is based at least in part on the determining that the first item allocated to the first category results in the constraint value that fails to meet the threshold condition.

* * * * *